Jan. 14, 1964             J. R. BUCK             3,117,797

EXPANDABLE OR CONTRACTIBLE WORKPIECE HOLDER

Filed May 2, 1962                           2 Sheets-Sheet 1

INVENTOR.
JAMES R. BUCK
BY Woodhams, Blanchard & Flynn
ATTORNEYS

INVENTOR.
JAMES R. BUCK

United States Patent Office 3,117,797
Patented Jan. 14, 1964

3,117,797
EXPANDABLE OR CONTRACTIBLE
WORKPIECE HOLDER
James R. Buck, Ross Township, Kalamazoo County,
Mich., assignor to Buck Tool Company, Kalamazoo,
Mich., a corporation of Michigan
Filed May 2, 1962, Ser. No. 191,950
13 Claims. (Cl. 279—2)

This invention relates to an expandable or contractible workpiece holder construction in which the expansible or contractible part thereof is given a maximum of support by the expansion or contraction-causing elements whereby a construction of improved strength and uniformity of operation is obtained, which construction also has additional manufacturing and operating economies and advantages.

In conventional expandable mandrel constructions with which I am familiar, there are provided one or more comparatively large ramps or cams along which the expansible part is moved to effect expansion thereof. This means that the force causing the expansion of the expansible part is concentrated at one or at most a few places on the inside surface of the expansible part and is correspondingly applied at only one or at most a few locations on the workpiece being gripped. This uneven application of force to the expansible part sometimes results in breakage thereof and may even, and often does, result in distortion of the workpiece being gripped by the expandable mandrel. This latter is particularly true where the workpiece has a relatively thin, radial wall thickness or where it is of a relatively short axial extent.

In an attempt to meet this problem, expandable mandrel constructions have been suggested in which the expansion-causing means comprises several relatively small cams which are arranged on an arbor to apply an expanding force to the expansible part at closely spaced locations along the entire axial length of the expansible part. Ordinarily the expansible part, which usually is cylindrical, has similarly arranged cams on its interal surface. This multi-cam type of construction has the obvious advantage that it increases the degree of uniformity at which the expansion-causing forces are applied to the expansible part and, accordingly, represents a substantial advance over the conventional constructions above referred to. However, such multi-cam constructions have created other problems which have rendered them somewhat less than completely satisfactory.

Prior known types of multi-cam, expandable mandrel constructions are relatively expensive to make, especially in small sizes, due to the necessity for accurately machining the complex cam structures. Further, no way has been found to protect such a construction from the entry into the internal, machined parts thereof of dust, dirt, metal-working debris and other foreign matter which will damage the machined surfaces and, in aggravated cases, even may jam the operating parts and prevent proper operation thereof.

Further, while such multi-cam, expandable mandrel constructions apply the expansion force to the expansible part at a relatively large number of points which are closely spaced axially of the expansible part, there still remains the problem, which also exists in the other known devices of this type previously referred to, that the expansion force is applied at points which are spaced apart circumferentially fairly widely. For example, the radius of curvature for the expansible part usually is such that it lies closely against the cams on the expansion-causing member when said expansible part is in its nonexpanded condition. Then when the expansible part is moved axially of the expansion-causing member and its cams are caused to ride upon the cams of the expansion-causing member, the curvature of the respectively engaging parts no longer match and the contact points at which pressure is applied to the expansible part are either at the center of the segments of the expansible part or are at the outer edges of each segment of the expansible part, depending upon the particular arrangement of the parts. This disadvantage has been considered inevitable and has been tolerated.

Accordingly, the present invention has been developed in a continuing effort to improve expandable mandrels of this general type, to reduce the cost of manufacture thereof and to increase the number of contact points at which pressure is applied to the expansible part for expanding same and to protect the operating parts from the entry thereinto of foreign materials which might damage same or interfere with accurate operation.

While the foregoing discussion has referred to expandable mandrels, similar problems are present in contractible workpiece holders. Accordingly, the present invention is also adapted to use on such contractible workpiece holders.

Accordingly, the objects of the invention include:

(1) To provide an improved expandable or contractible workpiece holder in which the expansion-causing force is applied to the expansible or contractible part at a large number of points, which points are closely spaced both axially and circumferentially of the holder.

(2) To provide an expandable or contractible holder, as aforesaid, having a large number of cams which are closely spaced both circumferentially and axially of the holder and by which the expansion or contraction-causing force may be applied with a high degree of uniformity to the surface of the expansible or contractible part.

(3) To provide an expandable or contractible holder, as aforesaid, which can be manufactured economically by relatively simple machining operations and yet with a high degree of accuracy.

(4) To provide an expandable or contractible holder, as aforesaid, which includes means for sealing the interior of the holder against the entry of dirt, dust, metal-working debris and the like.

(5) To provide an expandable or contractible holder, as aforesaid, which can be accurately made, particularly in small sizes, at relatively low cost.

(6) To provide an expandable or contractible holder, as aforesaid, wherein the cam structure of the expansion or contraction-causing member includes cams facing in both axial directions so that a single contraction or expansion-causing member can be used with either the same or different expansible or contractible parts and can effect expansion or contraction thereof upon relative movement between said member and said expansible or contractible part in either of two axial directions.

(7) To provide an expandable or contractible holder, as aforesaid, which can be made in sizes of short axial length and which, even when made in relatively long axial lengths, can be utilized for holding workpieces of short axial length without appreciable distortion of same.

(8) To provide an expandable or contractible holder, as aforesaid, in which the expansible or contractible part can be quickly and easily changed with respect to the expansion or contraction-causing part whereby such parts may be interchanged easily and quickly.

Other objects and purposes of the invention will be apparent to persons acquainted with apparatus of this general type upon reading the following disclosure and inspecting the accompanying drawings.

Figure 1:
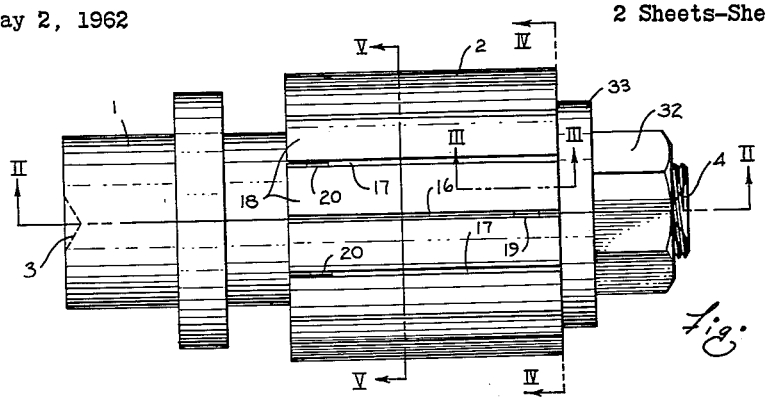
FIGURE 1 is a plan view of an expandable mandrel embodying the invention.

Referring to the drawings, the apparatus chosen to illustrate the invention comprises an arbor 1 which is adapted to be suitably supported in any convenient manner, either fixedly or for rotation. An expansible part 2 is mounted on the arbor 1 and said expansible part can be expanded radially outwardly with respect to said arbor upon relative axial movement therebetween as described further hereinbelow.

It will be recognized that a wide variety of devices are known by which the arbor 1 may be supported and a wide variety of devices are known by which relative axial motion may be effected between said arbor and the expansible part 2. Accordingly, it will be recognized that the specific apparatus shown herein is used solely to illustrate the invention and the subject matter of the invention, as defined hereinafter in the appended claims, may be applied in a wide variety of specific devices.

Figure 3:
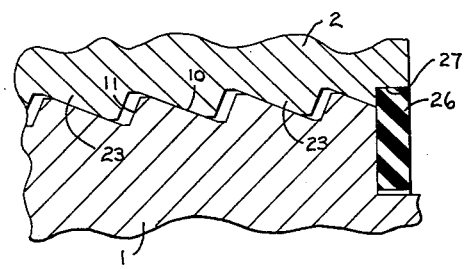
FIGURE 3 is a fragmentary sectional view taken along the line III—III of FIGURE 1.
Figure 4:
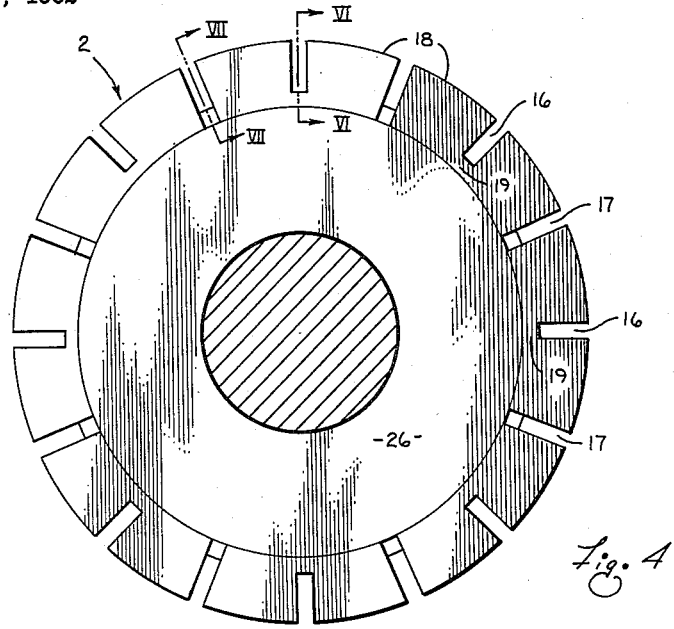
FIGURE 4 is a sectional view taken along the line IV—IV of FIGURE 1.

In the present embodiment, the arbor 1 is provided with openings 3 and 4 by which same can be mounted in a known manner on spaced centers, such as head and tail stock centers. The arbor 1 has an expansion-effecting zone 7 in which is located a series of circumferentially spaced, axially extending cam rows 8, each of which is comprised of a series of axially spaced cams 9. The cams 9 are integral with and project radially from the surface of the arbor. As best shown in FIGURE 3, the ramp side 10 of each individual cam 9 is relatively long and extends at a suitable, relatively small angle, such as 22½ degrees, to the axis of the arbor 1. The flank side 11 of the said cam 9, in this embodiment of the invention extends at a large angle, but less than 90 degrees, to the axis of the arbor 1 but this is for manufacturing and clearance purposes only. The slots 12 between the cam rows 8 preferably are of approximately the same circumferential width as said cam rows. It is to be noted that the cams 9 also are arranged in separate circumferential rows 13, each circumferential row 13 including a cam in each of said axially extending rows 8.

Figure 2:
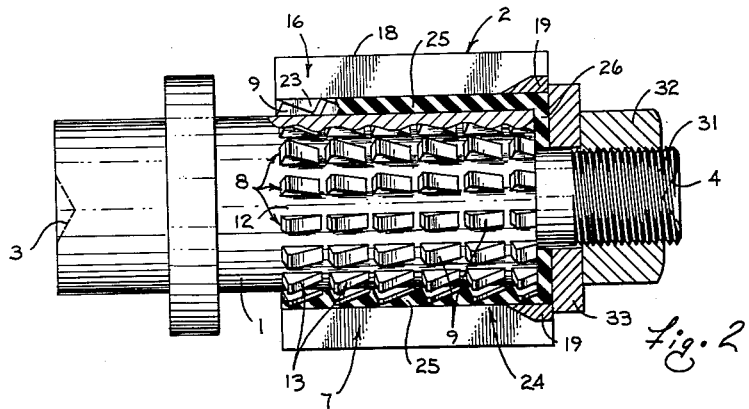
FIGURE 2 is a sectional view taken along the line II—II of FIGURE 1 and showing the arbor partially in relief, and partially broken away to the plane of said section.
Figure 7:
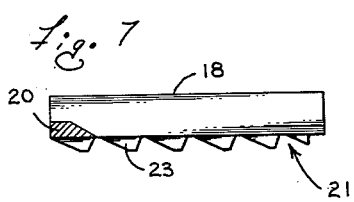
FIGURE 7 is a sectional view taken along the line VII—VII of FIGURE 4.
Figure 6:
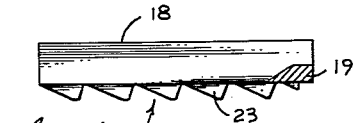
FIGURE 6 is a sectional view taken along the line VI—VI of FIGURE 4.

Referring now to the expansible part 2, this is a substantially cylindrical sleeve or collet which has a series of alternately arranged slots 16 and 17 formed therein dividing same into segments 18 which are movable substantially radially with respect to each other to a limited extent. The segments 18 are connected to each other by uncut portions 19 (FIGURES 2 and 6) and 20 (FIGURE 7) which are located at opposite axial ends of the slots 16 and 17, respectively. The uncut portions 19 and 20 extend a fixed distance from the inner surface of the expansible part 2 but said distance is less than the radial thickness of the expansible part 2. The uncut portions 19 and 20 may be made standard for all sizes and thicknesses of expansible parts 2 so that the stiffness of said expansible parts can be accurately controlled and can be made substantially uniform. Other types of slotting, however, either alternate from opposite ends or all from the same end, both of which are well known to persons acquainted with devices of this type, may be utilized within the scope of the invention.

The inner surface of the expansible part 2 is provided with a series of circumferentially spaced, axially extending, cam bars 21. Axially extending slots 22 are provided between the bars 21 and said bars each comprise a series of axially spaced cams 23 thereon. The cross-sectional shape, size and spacing of the cams 23 are substantially the same as those of the cams 9 and said cams 23 and 9 are adapted to interfit. The slots 12 and 22 are of sufficient radial depth that the cams 23 and 9, respectively, are movable axially therethrough. Thus, the arbor 1 and the expansible part 2 can be assembled by aligning the cam bars 21 of the expansible part 2 with the slots 12 of the arbor 1, which also aligns rows 8 with slots 22, telescoping the parts until cams 23 are circumferentially aligned with selected spaces between the cams 9 and then rotating the expansible part 2 sufficiently with respect to the arbor 1 to effect interengagement of the cams 9 and 23. In such position each slot 22 will be radially aligned with a slot 12.

The parts can then be releasably locked in such position by inserting a key into at least one of the sets of the aligned slots 12 and 22. It will be apparent that for some uses of the apparatus a single key will be sufficient. Preferably, however, where dust protection is desired, as it normally will be, a combined dust shield and key member 24 will be utilized. The member 24 has a plurality of axially extending keys 25 which are circumferentially spaced apart the same distance as the slots 12 and 22. The keys 25 are connected at one end thereof by a connecting ring 26. When the keys 25 are slid into aligned slots 12 and 22, they will prevent relative rotation between the expansible part 2 and the arbor 1. The ring 26 fits into a recess 27 in the expansible part 2 and functions effectively as a dust and dirt seal. Further, the presence of the key 25 in the slots 12 and 22 will tend to prevent the entry of foreign material from the other (leftward as appearing in FIGURE 1) end of the expansible part 2 and thus the protection of the interengaging cammed surfaces from damage by dust and dirt will be extremely effective.

Figure 5:
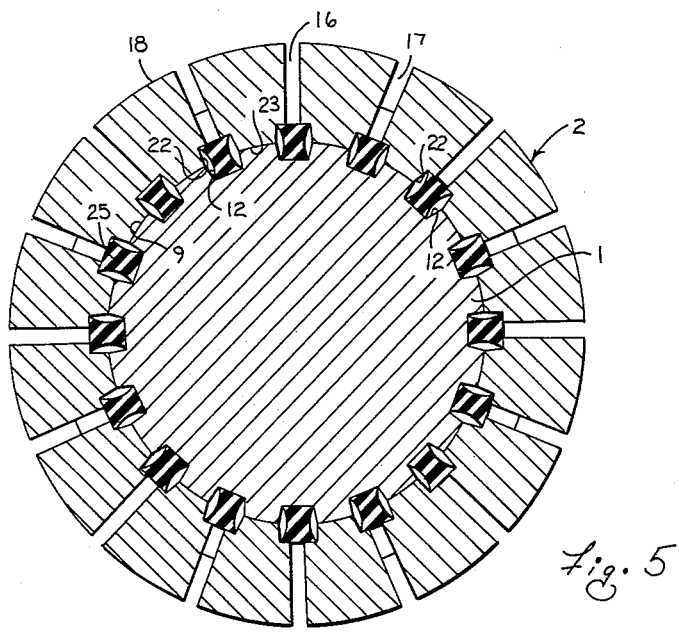
FIGURE 5 is a sectional view taken along the line V—V of FIGURE 1.
Figure 8:
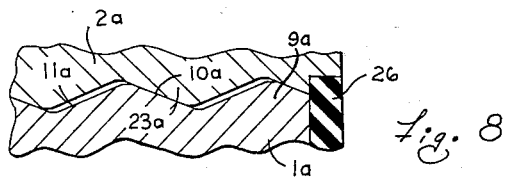
FIGURE 8 is a view similar to FIGURE 3 illustrating a modification.

Since there is relatively little tendency for the parts of the expansible part 2 to rotate with respect to the arbor 1 due to the friction which exists between the cams 9 and 23 when the part 2 is expanded, it is sufficient for keying purposes if the key member 24 is made from a resilient, plastic material, such as neoprene or a vinyl. The making of said key member 24 from a resilient, plastic material will greatly increase its effectiveness for dirt-excluding purposes. This is even further enhanced by making the keys 25 of normal cross-sectional area as indicated in FIGURE 5 so that said keys crowd into a pair of slots 12 and 22 in a highly effective, dirt-excluding manner.

In FIGURE 3 there is shown a modification in which the expansible part 2a and the arbor 1a have a modified cam construction so that said expansible part may be expanded by movement in either axial direction with respect to said arbor. Thus, both the ramp side 10a and the flank side 11a of the cams 9a extend at similar angles to the axis of the arbor 1a. The cams 23a are similarly shaped. This will have certain advantages, at least from a manufacturing standpoint, in that a single arbor or a single expansible part can be used for a variety of different specific applications. The remainder of the construction is identical with that already above described.

While any convenient means known to the art may be provided for effecting relative axial movement between the arbor 1 and expansible part 2, one suitable construction is shown herein for purposes of completeness. The rightward end of the arbor 1 is threaded at 31 and a nut 32 is threaded thereon. A thrust collar 33 is interposed between the nut 32 and the adjacent axial end of the expansible part 2. Rotation of said nut 32 to cause same to move in a leftward direction as appearing in FIGURE 1 will cause the collar 33 to engage the rightward end of the expansible part 2 and move same leftwardly with respect to the arbor 1. This causes the cams 23 to move up the cams 9 and thereby effect expansion of the expansible part 2. It will be understood, however, that while the nut 32 represents a means which is in common use in devices of this general type, it is here shown primarily to illustrate one suitable means by which axial movement of the expansible part 2 with respect to the arbor 1 can be effected. The nut 32 may be replaced by many other well-known devices for performing the same function, such as a common draw bar used in connection with collet chucks.

Figure 9:
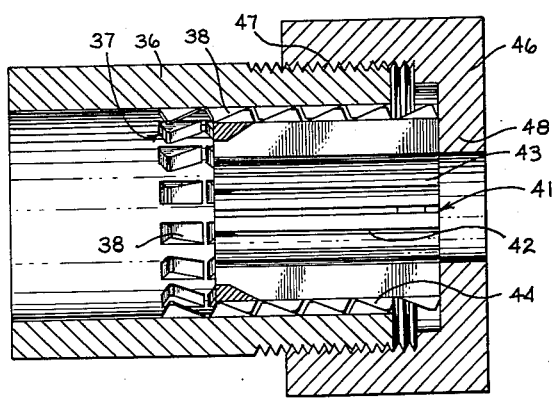
FIGURE 9 is a view similar to FIGURE 2 illustrating another modification.

A further modification of the invention is shown in FIGURE 9 and this embodiment is intended for gripping the periphery of a workpiece. A tubular member 36 has a series of circumferentially spaced cam bars 37 on its interior surface, each of said cam bars comprising a series of axially spaced cams 38. The cams 38 in the bars are circumferentially aligned and are shaped in the same manner as the cams 23 in the principal embodiment of the invention. A contractible part 41 is disposed within the tubular member 36 and it is divided by axially extending slits 42 into segments 43. Each segment 43 has a row of axially spaced cams 44 which are adapted to interfit with the cams 38 of the tubular member 36. In general, the contractible part 41 corresponds to the expansible part 2 in the principal embodiment except that the cams 44 are on the exterior thereof while the tubular member 36 corresponds to the arbor 1 except that the cams 38 are provided on the interior thereof. The cams 38 and 44 can be interfitted with each other in the same manner as the cams 9 and 23.

A nut 46 is threaded onto the threaded portion 47 of the tubular member 36. The nut 46 has a flange 48 which is adapted to engage one axial end of the contractible part 41 to urge same axially with respect to the tubular member 36 whereby said contractible part may be contracted to grip the periphery of a workpiece therewithin.

Although particular preferred embodiments of the invention have been described above in detail for illustrative purposes, it will be recognized that variations or modifications of such disclosure, which lie within the scope of the appended claims, are fully contemplated.

What is claimed is:

1. Means for changing the diameter of one of concentric inner and outer members in response to relative axial movement therebetween, at least one of said members being annular, comprising in combination:
    means defining a plurality of circumferentially spaced slits extending axially along a part of the axial length of, and extending radially through the circumferential walls of, that one of said members whose diameter is to be changed whereby said member is capable of a change in diameter;
    a plurality of axially spaced, circumferentially arranged cams on the outer surface of said inner member;
    a plurality of axially spaced, circumferentially arranged cams on the inner surface of said outer member which are mateable with said first-named cams;
    means defining a first set of circumferentially spaced, axially extending slots through the cams on said outer member and a second set of circumferentially spaced, axially extending slots through the cams on said inner member, the slots of said first and second sets being circumferentially spaced a sufficient distance to permit the cams in one member to fit within the slots in the other member whereby said members can be moved axially with respect to each other;
    whereby said inner and outer members may be interengaged by relative axial movement therebetween and the cams on said inner and outer members may then be brought into mating contact with each other by relative rotation of said members with respect to each other.

2. Means for changing the diameter of an annular member which is associated with a second member in response to relative axial movement therebetween, comprising in combination:
    means defining a plurality of circumferentially spaced, axially extending blind slits extending radially through the circumferential walls of said annular member whereby said annular member is capable of said change in diameter;
    a plurality of axially spaced, circumferentially arranged cams on said annular member;
    a plurality of axially spaced, circumferentially arranged cams on said second member which are mateable with said first-named cams;
    means defining a first set of circumferentially spaced, axially extending slots through the cams on said annular member and a second set of circumferentially spaced, axially extending slots through the cams on said second member, the slots of said first and second sets being circumferentially spaced a sufficient distance to permit the cams on said annular member to fit within the slots in said second member whereby said members can be moved axially with respect to each other;
    whereby said annular and second members may be interengaged by relative axial movement therebetween and the cams on said second and annular members may then be brought into mating contact with each other by relative rotation of said members with respect to each other.

3. The device defined in claim 2 wherein at least one of said slots in said annular member is radially aligned with a slot in said second member when said cams are in mating contact with each other for receiving a locking key therein.

4. The device defined in claim 3 including a key within at least one of said radially aligned slots.

5. The device defined in claim 2 wherein each of the slots in the annular member is radially aligned with a slot in the second member, a key within each one of selected pairs of said radially aligned slots and a dust-shielding ring connected to one end of said keys.

6. The device defined in claim 2 including an annular groove adjacent one end of said members, selected pairs of slots on said annular and second members being radially aligned with each other when the cams are in mating engagement with each other, keys within selected ones of said radially aligned slots, and a dust-shielding ring connected to said keys at one end thereof, said ring being received into said groove.

7. The device defined in claim 2 including means for effecting relative axial movement of one of said members with respect to the other.

8. The device defined in claim 2 wherein the cams each include similar ramps which all face in a single direction at a relatively small angle to the lengthwise extent of said members, said cams also having substantially radially arranged flank surfaces.

9. The device defined in claim 2 wherein the cams each include similar but oppositely facing cam surfaces, the cams on one of said members contacting at a given time only on the cam surfaces on the other of said members which are facing in a single direction.

10. The device defined in claim 2 wherein said slits are axially blind at alternating axial ends thereof whereby said change in diameter is essentially constant throughout the axial length of said annular member.

11. The device defined in claim 2 wherein said slits communicate with and extend radially from said first set of slots.

12. The device defined in claim 6 wherein said slits communicate with and extend radially outwardly from those slots in said annular member which are radially aligned with slots in said second member when said cams are in mating engagement with each other; and said keys being of resilient material and extending radially in said radially aligned slots whereby to seal the radially inner end of said slits from said slots.

13. A workpiece holder, comprising:

an inner member having circumferentially spaced, axially extending rows of cams of the outer surface thereof;

an annular outer member concentric with said inner member and having circumferentially spaced, axially extending rows of cams on the inner surface thereof and engageable with said cams on said inner member, the rows of cams on both said members being spaced apart so that the cam rows on one of said members can be moved axially through the spaces between the cam rows on the other member to position said members axially with respect to each other and then the cams can be engaged by rotating said members relative to each other;

one of said members having a series of circumferentially spaced, axially extending slots therethrough dividing same into a plurality of segments which can flex radially when the engaged cams are moved axially with respect to each other; and means for effecting relative axial movement of said members while said cams are in engagement.

References Cited in the file of this patent

UNITED STATES PATENTS

| | | |
|---|---|---|
| 2,690,914 | Bryant et al. | Oct. 5, 1954 |
| 2,833,548 | Clark | May 6, 1958 |
| 2,859,041 | Sloan | Nov. 4, 1958 |
| 2,944,523 | Werstein | July 12, 1960 |